(12) United States Patent
Prasad et al.

(10) Patent No.: US 8,286,654 B2
(45) Date of Patent: Oct. 16, 2012

(54) GAS TURBINE ENGINE INLET WITH NOISE REDUCTION FEATURES

(75) Inventors: Dilip Prasad, Vernon, CT (US); Jinzhang Feng, Avon, CT (US); Jayant S. Sabnis, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 7 days.

(21) Appl. No.: 12/775,649

(22) Filed: May 7, 2010

(65) Prior Publication Data
US 2010/0215479 A1 Aug. 26, 2010

Related U.S. Application Data

(62) Division of application No. 11/588,544, filed on Oct. 27, 2006, now Pat. No. 7,739,865, which is a division of application No. 10/865,025, filed on Jun. 10, 2004, now abandoned.

(51) Int. Cl.
*F02B 27/00* (2006.01)

(52) U.S. Cl. ............ 137/15.1; 244/53 B; 60/226.1; 181/213

(58) Field of Classification Search .......... 60/226.1, 60/226.3, 262, 779, 39.091; 181/213; 244/53 B; 137/15.1, 15.2
See application file for complete search history.

(56) References Cited

U.S. PATENT DOCUMENTS

| | | | |
|---|---|---|---|
| 2,343,918 A * | 3/1944 | McCoy | 244/134 A |
| 2,401,247 A * | 5/1946 | Hunter | 244/134 A |
| 2,763,426 A * | 9/1956 | Erwin | 415/157 |
| 2,948,111 A | 8/1960 | Nelson | |
| 3,494,380 A * | 2/1970 | Erwin | 138/39 |
| 3,532,100 A * | 10/1970 | Morris et al. | 137/15.1 |
| 3,575,259 A | 4/1971 | Wilkinson | |
| 3,589,132 A | 6/1971 | Du Pont | |
| 3,611,724 A | 10/1971 | Kutney | |
| 3,618,699 A | 11/1971 | Evans | |

(Continued)

FOREIGN PATENT DOCUMENTS

GB 800380 8/1958

(Continued)

OTHER PUBLICATIONS

European Search Report, dated Jul. 15, 2009, EP Application No. 05253602.6-2315/1607603.

*Primary Examiner* — William H Rodriguez
(74) *Attorney, Agent, or Firm* — Carlson, Gaskey & Olds PC

(57) ABSTRACT

A gas turbine engine comprising a fan section, a compressor, a combustor and a turbine, includes a nacelle having an inner nacelle surface defining an inlet duct designed to reduce an inlet duct area of the inlet duct to increase acoustic attenuation. The gas turbine engine also includes a spinner, disposed forward of the fan section, that includes features to increase acoustic attenuation. In one embodiment of the present invention, the nacelle includes a nacelle contoured surface protruding radially inward from the inner nacelle surface to reduce the inlet duct area. In a further embodiment of the present invention, the spinner includes a spinner contoured surface for reducing the inlet duct area. In other embodiments, the nacelle and/or the spinner include an inflatable bladder, a SMA actuator, a fluidic actuator, or a combination thereof, selectively activated to increase acoustic attenuation during certain conditions of an aircraft.

10 Claims, 18 Drawing Sheets

U.S. PATENT DOCUMENTS

| | | | |
|---|---|---|---|
| 3,623,494 A * | 11/1971 | Poucher | 137/15.2 |
| 3,763,874 A * | 10/1973 | Wilde et al. | 137/15.1 |
| 4,154,256 A * | 5/1979 | Miller | 137/15.1 |
| 4,155,221 A | 5/1979 | Dhoore et al. | |
| 4,351,150 A | 9/1982 | Schulze | |
| 4,474,001 A | 10/1984 | Griffin et al. | |
| 4,860,537 A | 8/1989 | Taylor | |
| 4,947,958 A * | 8/1990 | Snyder | 181/296 |
| 5,706,648 A | 1/1998 | Porte et al. | |
| 5,867,979 A | 2/1999 | Newton et al. | |
| 5,894,721 A | 4/1999 | Hanson | |
| 6,089,505 A | 7/2000 | Gruensfelder et al. | |
| 6,260,567 B1 * | 7/2001 | Gruensfelder et al. | 137/1 |
| 6,318,070 B1 * | 11/2001 | Rey et al. | 60/226.3 |
| 6,735,936 B2 * | 5/2004 | Rey et al. | 60/226.3 |
| 6,868,664 B2 | 3/2005 | Albero et al. | |
| 7,004,047 B2 * | 2/2006 | Rey et al. | 74/469 |
| 7,086,219 B2 | 8/2006 | Stretton et al. | |
| 7,340,883 B2 * | 3/2008 | Wood et al. | 60/226.1 |
| 2006/0179871 A1 | 8/2006 | Maguire | |
| 2008/0283676 A1 * | 11/2008 | Jain et al. | 244/53 B |
| 2009/0056306 A1 | 3/2009 | Suciu et al. | |

FOREIGN PATENT DOCUMENTS

| | | |
|---|---|---|
| GB | 1067129 | 5/1967 |
| GB | 1171508 | 11/1969 |
| WO | 0236951 | 5/2002 |

* cited by examiner

GAS TURBINE ENGINE INLET WITH NOISE REDUCTION FEATURES

CROSS REFERENCE TO RELATED APPLICATIONS

The present application is a divisional application of U.S. patent application. Ser. No. 11/588,544, filed Oct. 27, 2006 (now U.S. Pat. No. 7,739,865), which is a divisional application of U.S. patent application Ser. No. 10/865,025, filed Jun. 10, 2004 (abandoned).

BACKGROUND

The present invention relates to gas turbine engines and, more particularly, to reduction of noise emanating therefrom.

In recent years, noise generated by flying aircraft has attracted attention and is now subject of various governmental regulations. Efforts need to be made to minimize annoyance to neighborhoods located in the path of departing and landing aircraft. The noise is especially disturbing during certain flight conditions such as takeoffs and landings of the aircraft.

The aircraft noise is primarily generated by gas turbine engines propelling the aircraft. One major source of the noise generated by the gas turbine engine is the fan section. The fan generates tonal and broadband acoustic energy propagating outward of the engine through an inlet and through a bypass nozzle.

Various considerations dictate design of the gas turbine engine that propels an aircraft. For example, several critical concerns are thrust of the engine, fuel efficiency, cooling, and the overall weight. Frequently, optimization of one factor results in undesirable consequences for another. Therefore, design of an engine includes multiple trade-offs to obtain an optimal engine. Although noise generated by the gas turbine engine is now subject to fairly stringent governmental regulations, to date, the noise considerations were not part of the design optimization for conventional engines.

SUMMARY

According to the present invention, a gas turbine engine comprises a nacelle enclosing a fan section, a compressor, a combustor and a turbine, with the nacelle including an inner nacelle surface defining an inlet duct and means for reducing an inlet duct area of the inlet duct to increase acoustic attenuation during certain conditions of an aircraft. The means for reducing the inlet area is disposed on an inner nacelle surface or on a spinner, disposed forward of the fan section, or on both, the inner nacelle surface and the spinner surface.

In one embodiment of the present invention, the means for reducing the inlet area includes a nacelle contoured surface protruding radially inward from the inner nacelle surface to reduce the inlet duct area. In another embodiment of the present invention, the means for reducing the inlet area includes a spinner contoured surface protruding into the inlet duct to reduce the inlet duct area. In yet another embodiment, the means for reducing the inlet area comprises means for selectively reducing the inlet area. In a further embodiment, the means for selectively reducing the inlet area comprises an inflatable bladder, a SMA actuator, a fluidic actuator, or a combination thereof. The inflatable bladder, the SMA actuator, and the fluidic actuator are disposed on an inner nacelle surface or on a spinner, or on both, the inner nacelle surface and the spinner surface. The means for selectively reducing the inlet area may be also used in combination with the nacelle and/or spinner contoured surfaces.

The foregoing and other advantages of the present invention become more apparent in light of the following detailed description of the exemplary embodiments thereof, as illustrated in the accompanying drawings.

DETAILED DESCRIPTION

Figure 1:
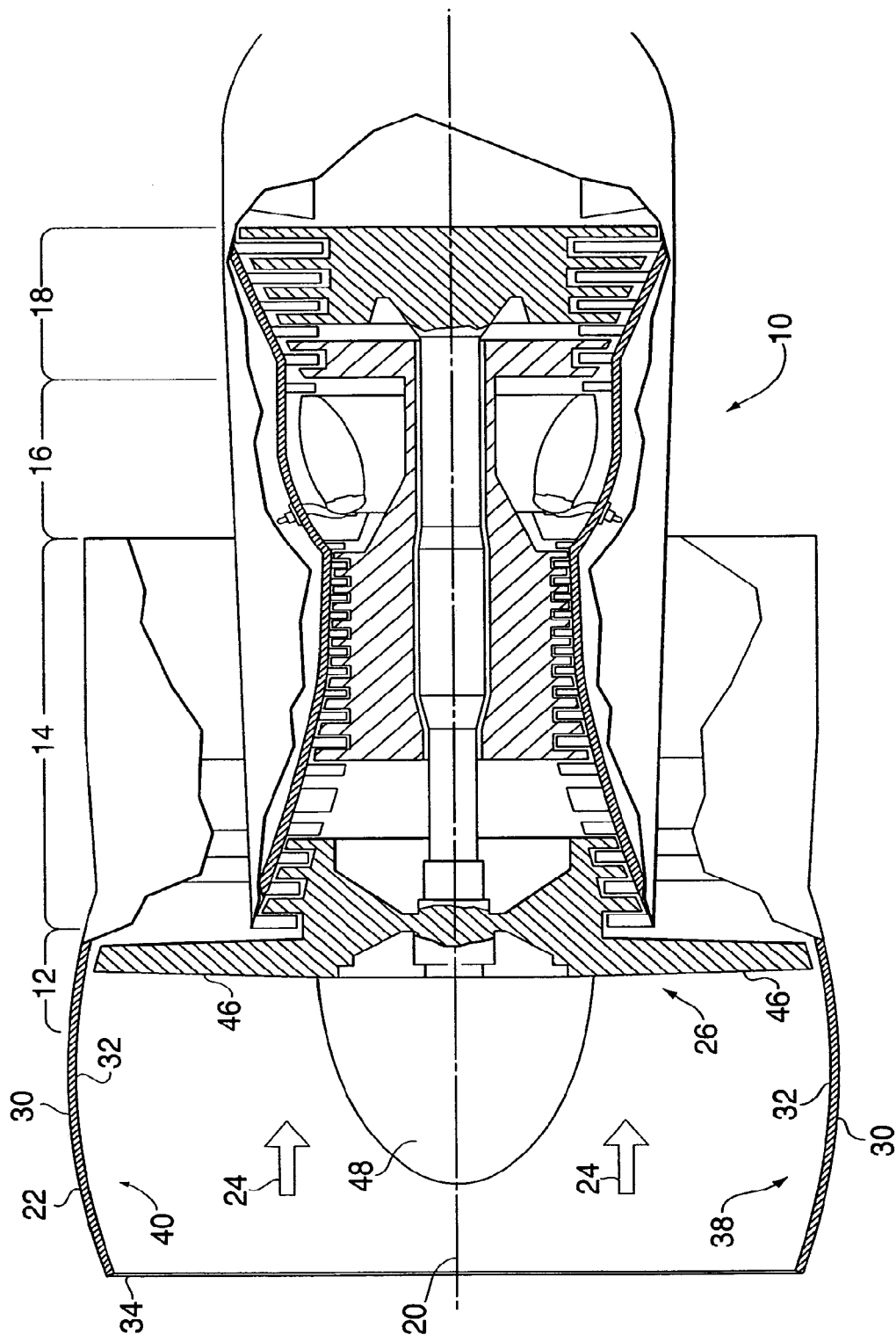
FIG. 1 is a schematic representation of a gas turbine engine.
Figure 2:
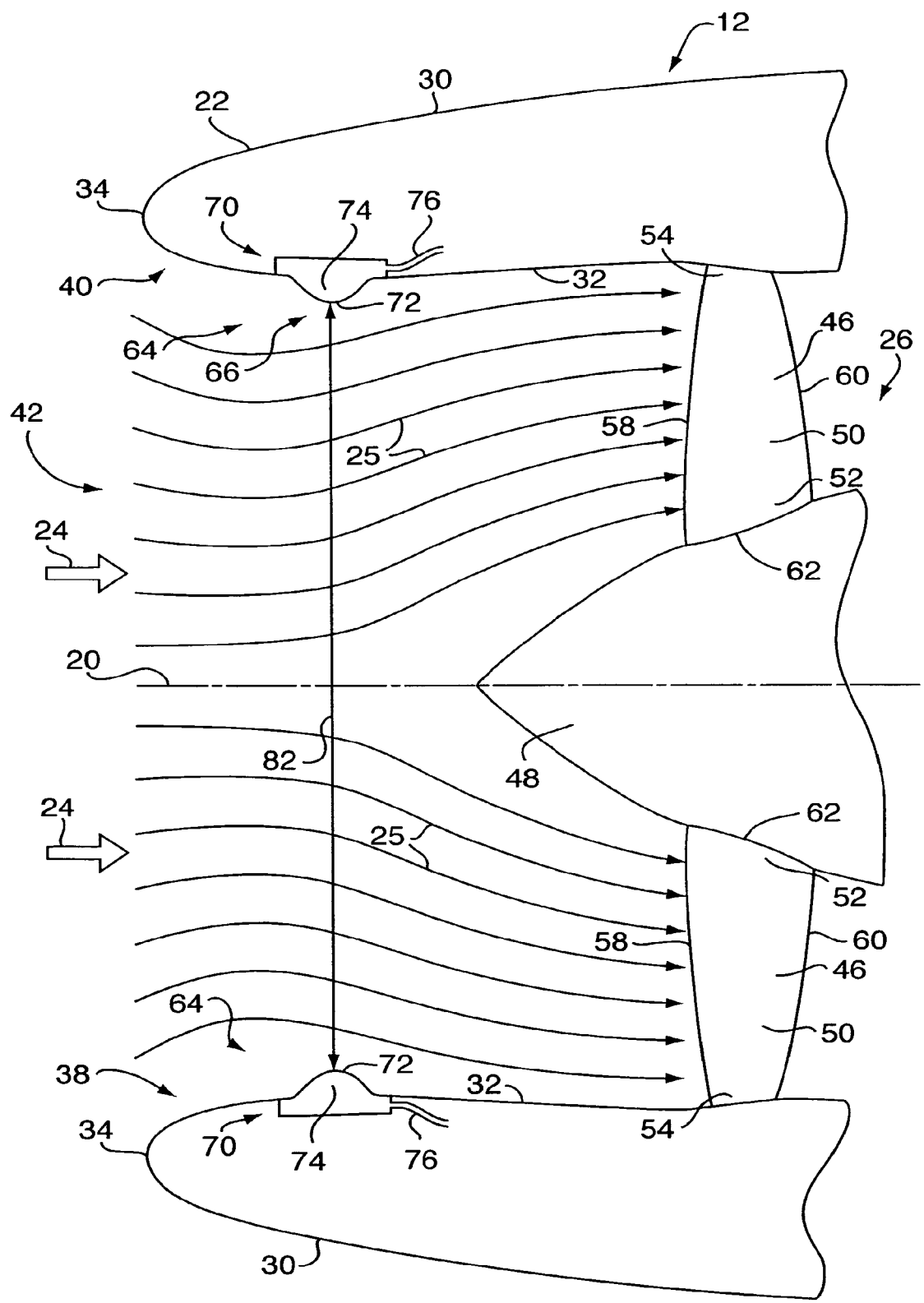
FIG. 2 is a schematic, partially broken-away representation of a portion of a nacelle and fan section including means for reducing inlet area of the gas turbine engine of FIG. 1 according to one embodiment of the present invention.

Referring to FIG. 1, a gas turbine engine 10 includes a fan section 12, a compressor 14, a combustor 16, and a turbine 18 centered around a central axis 20 and enclosed in a nacelle 22. Air 24 flows axially through the sections 12-18 of the engine 10 forming streamlines 25, as seen in FIG. 2. The fan section 12 includes a fan 26 which accelerates the air 24 to contribute to the overall thrust generated by the engine. As is well known in the art, the air 24, compressed in the compressor 14, is mixed with fuel and burnt in the combustor 16. Subsequently, the hot gases expand in the turbine 18 generating thrust to propel the engine 10 and to drive the turbine 18, which in turn drives the fan 26 and the compressor 14.

Referring to FIG. 2, the nacelle 22 includes an outer nacelle surface 30 and an inner nacelle surface 32 joined at a nacelle leading edge 34. The nacelle also includes a lower portion 38 and an upper portion 40. The inner nacelle surface 32 defines an inlet duct 42 having an inlet duct area.

The fan 26 of the engine 10 includes a plurality of fan blades 46 and a spinner 48 disposed forward of the fan 26. Each fan blade 46 comprises an airfoil-shaped portion 50 that spans radially from a root 52 to a tip 54 and extends from a leading edge 58 to a trailing edge 60. The root of each fan blade is inserted into a hub 62. The engine 10 of FIG. 2 further includes means for reducing the inlet area 64. In several embodiments of the present invention, the means for reducing the inlet area includes means for selectively reducing the inlet area 66 of the nacelle. One such embodiment, shown in FIG. 2, includes an inflatable bladder 70 disposed on the inner nacelle surface 32. The bladder 70 comprises a bladder surface 72 and a plenum 74 disposed radially outward of the bladder surface 72. The plenum is fed pressurized fluid via a pressure feed 76. The pressurized fluid can be channeled from various other portions of the engine, such as, for example, the compressor. The bladder 70 has a distended position and a retracted position. In the distended position, shown in FIG. 2, the bladder reduces the inlet duct area of the nacelle, forming a throat 82. In the retracted position, the bladder surface 72 is substantially flush with the inner nacelle surface 32. The plenum 74 can be either actively depressurized or allowed to deflate gradually from the distended position into the retracted position.

Figure 3:
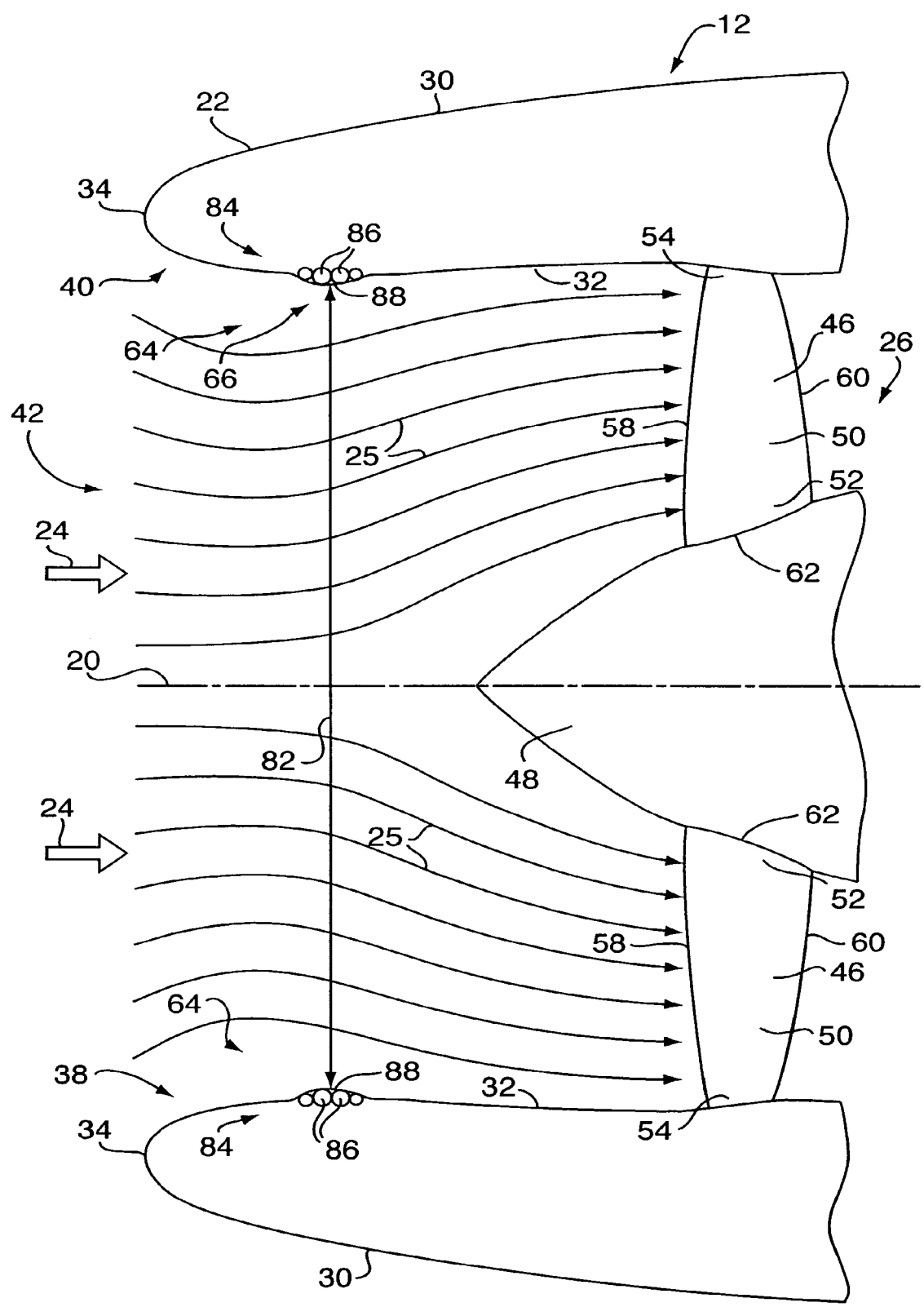
FIG. 3 is a schematic, partially broken-away representation of a portion of a nacelle and fan section including means for reducing inlet area of the gas turbine engine of FIG. 1 according to another embodiment of the present invention.

Referring to FIG. 3, in another embodiment of the present invention, the means for selectively reducing the inlet area 66 includes an SMA actuator 84 comprising a plurality of SMA (shape memory alloy) members 86 disposed radially outward of a compliant surface 88. As is well known in the art, the SMA material changes shape when it is heated and resumes its original shape once the heating is seized, or vice versa. Thus, the means for selectively reducing the inlet area 66 has two positions, a distended position and a retracted position. In the distended position, the SMA members are heated and force the compliant surface 88 to extend into the inlet duct area, thereby reducing the diameter of the inlet duct 42 and defining the throat 82 of the inlet duct. The SMA members are either actively cooled or allowed to cool to resume its initial position. In the initial position, the SMA members retract and allow the compliant surface to be substantially flush with the inner nacelle surface 32. The SMA members 86 can have various configurations. For example, the SMA members can be in the form of either rings, ropes or other shapes.

Figure 4:
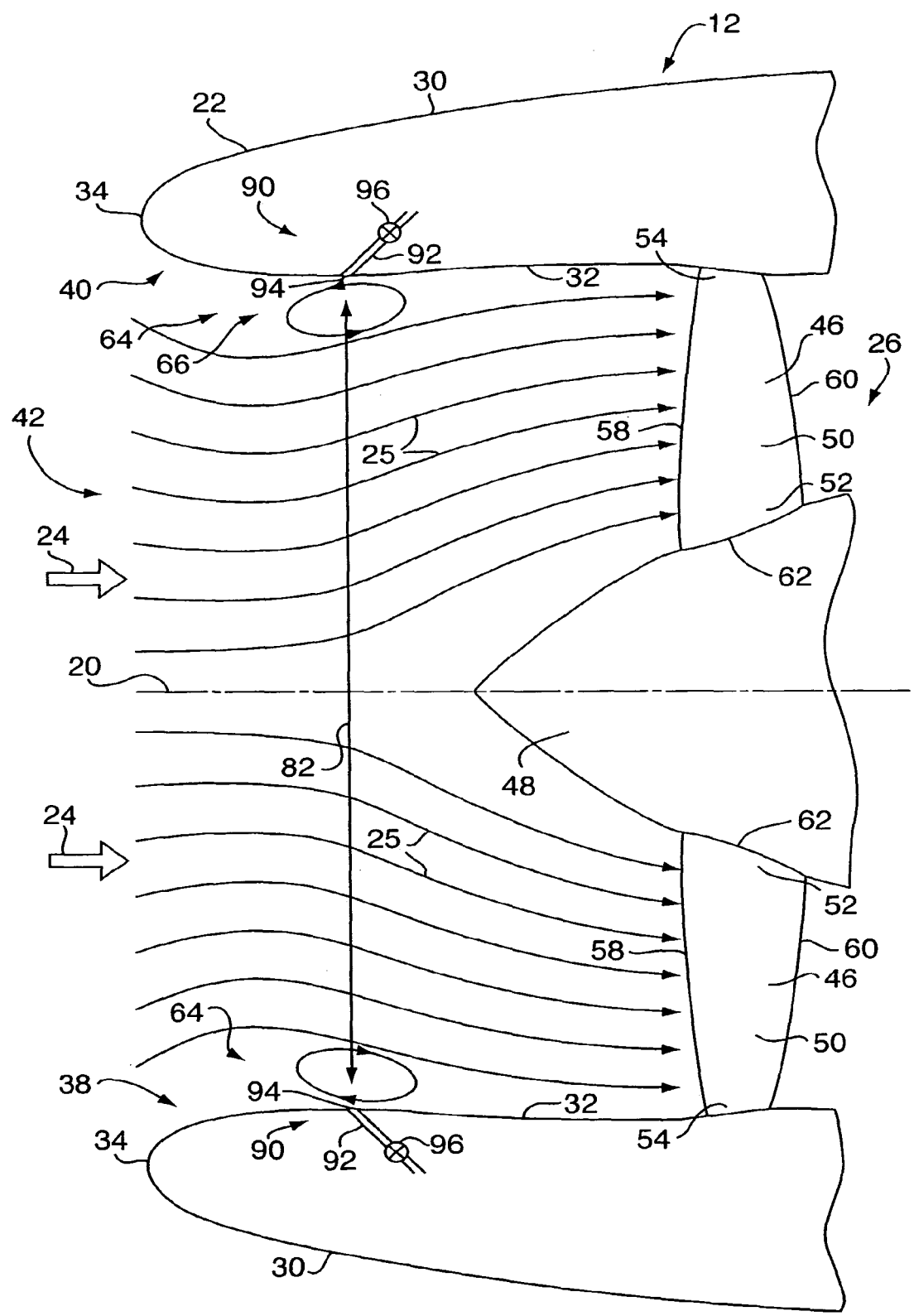
FIG. 4 is a schematic, partially broken-away representation of a portion of a nacelle and fan section including means for reducing inlet area of the gas turbine engine of FIG. 1 according to a further embodiment of the present invention.

Referring to FIG. 4, the means for selectively reducing the inlet area 66 of the nacelle in this embodiment is a fluidic actuator 90. The fluidic actuator is disposed within the nacelle 22 and includes an air injector 92 having an opening 94 formed within the inner nacelle surface 32 and being fed pressurized air channeled from another portion of the engine 10. The fluidic actuators 90 further include switching means 96 for switching between activated and deactivated condition. In the activated condition, the pressurized air is blown through the opening 94 of the air injector 92 radially inward of the inner nacelle surface 32 into the inlet duct 42. In the deactivated condition, the pressurized air is turned off and no air comes through the air injector.

Figure 5:
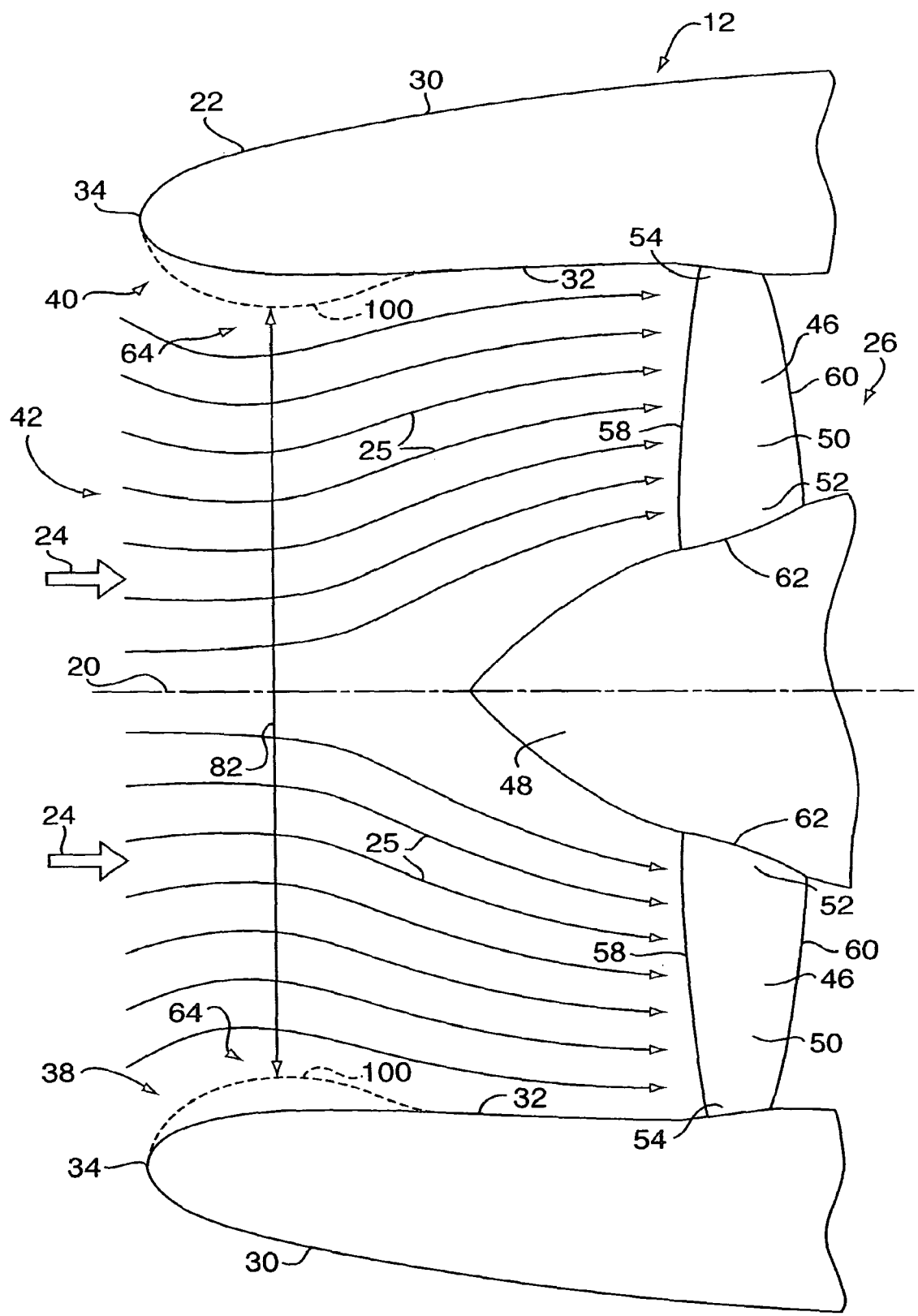
FIG. 5 is a schematic, partially broken-away representation of a portion of a nacelle and fan section including means for reducing inlet area of the gas turbine engine of FIG. 1 according to another embodiment of the present invention.

Referring to FIG. 5, in a further embodiment of the present invention, the means for reducing the inlet area 64 includes a nacelle contoured surface 100 formed on the inner nacelle surface 32 that reduces the inlet duct area 42 to define the throat 82 therebetween. The nacelle contoured surface 100 is formed at the forward portion of the nacelle toward the nacelle leading edge 34 and defines a relatively steep and localized contour.

Figure 6:
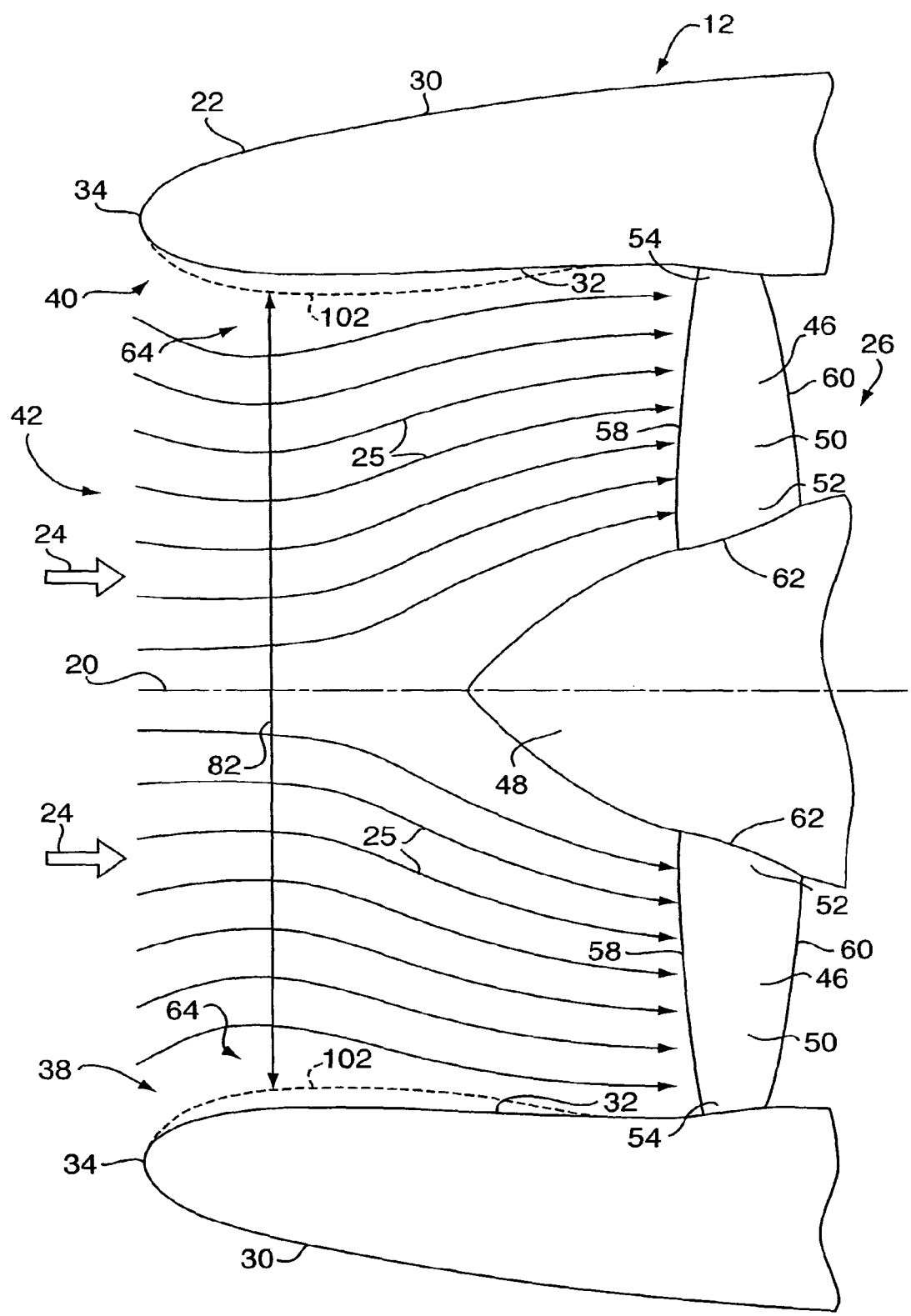
FIG. 6 is a schematic, partially broken-away representation of a portion of a nacelle and fan section including means for reducing inlet area of the gas turbine engine of FIG. 1 according to a further embodiment of the present invention.

Referring to FIG. 6, in a further embodiment of the present invention, the means for reducing the inlet area 64 includes a nacelle contoured surface 102 formed on the inner nacelle surface that reduces the inlet duct area to define the throat 82 therebetween. The nacelle contoured surface 102 extends from the nacelle leading edge 34 axially downstream toward the fan 26. The nacelle contoured surface 102 is formed on the inner nacelle surface 32 and is less steep than the nacelle contoured surface 100 shown in FIG. 5.

Figure 6A:
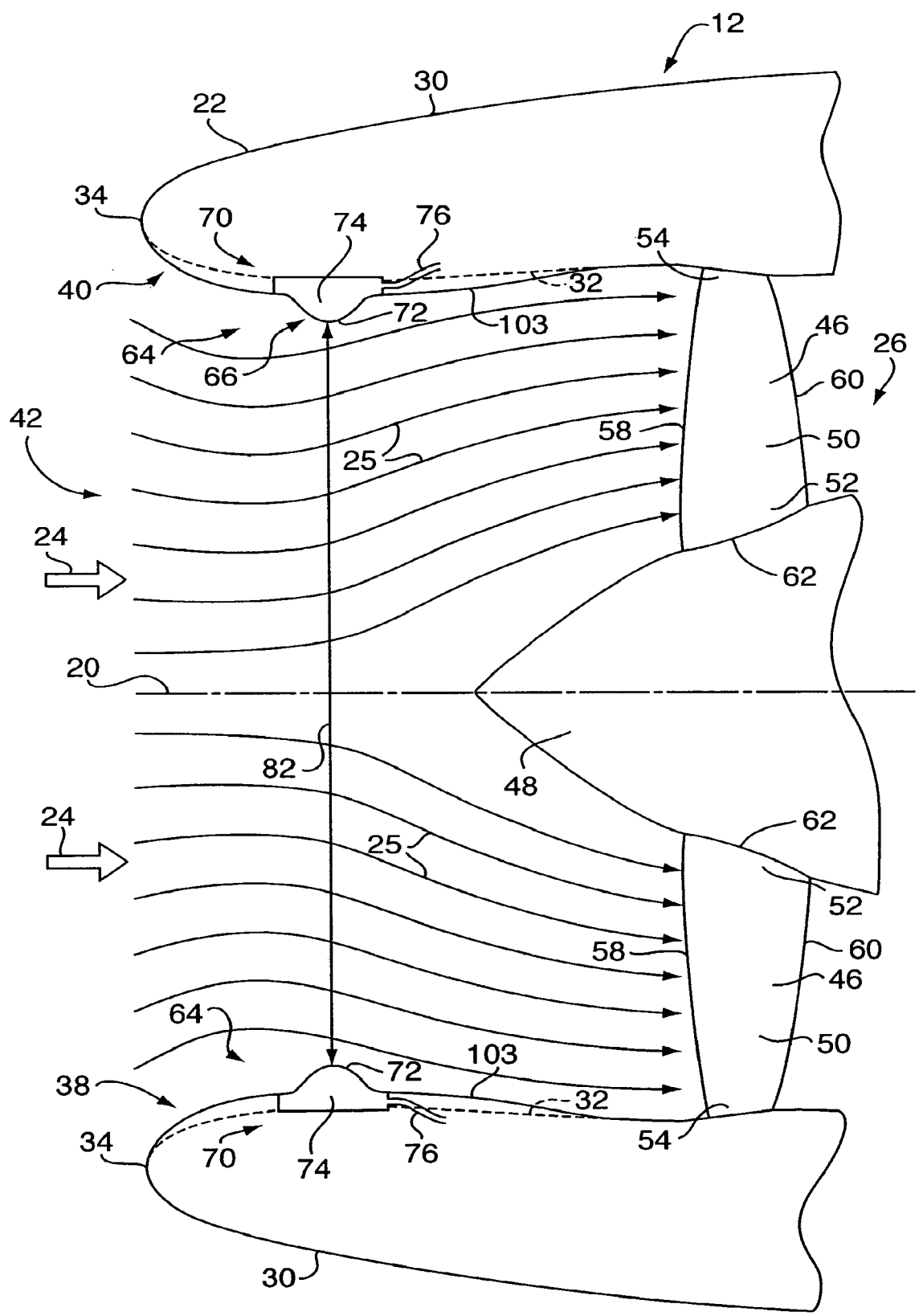
FIG. 6A is a schematic, partially broken-away representation of a portion of a nacelle and fan section including means for reducing inlet area of the gas turbine engine of FIG. 1 according to a further embodiment of the present invention.

Referring to FIG. 6A, the means for reducing the inlet area 64 includes a contoured surface 103 and means for selectively reducing the inlet area 66. Although FIG. 6A shows the means for selectively reducing the inlet area as the inflatable bladder, the means for reducing the inlet area 66 can be either the SMA or fluidic actuator, or others. Thus, the contoured surface 103 reduces the inlet duct area defining the throat 82 and the means for reducing the inlet area 66 further reduces the inlet duct area when in deployed or activated condition.

Figure 7:
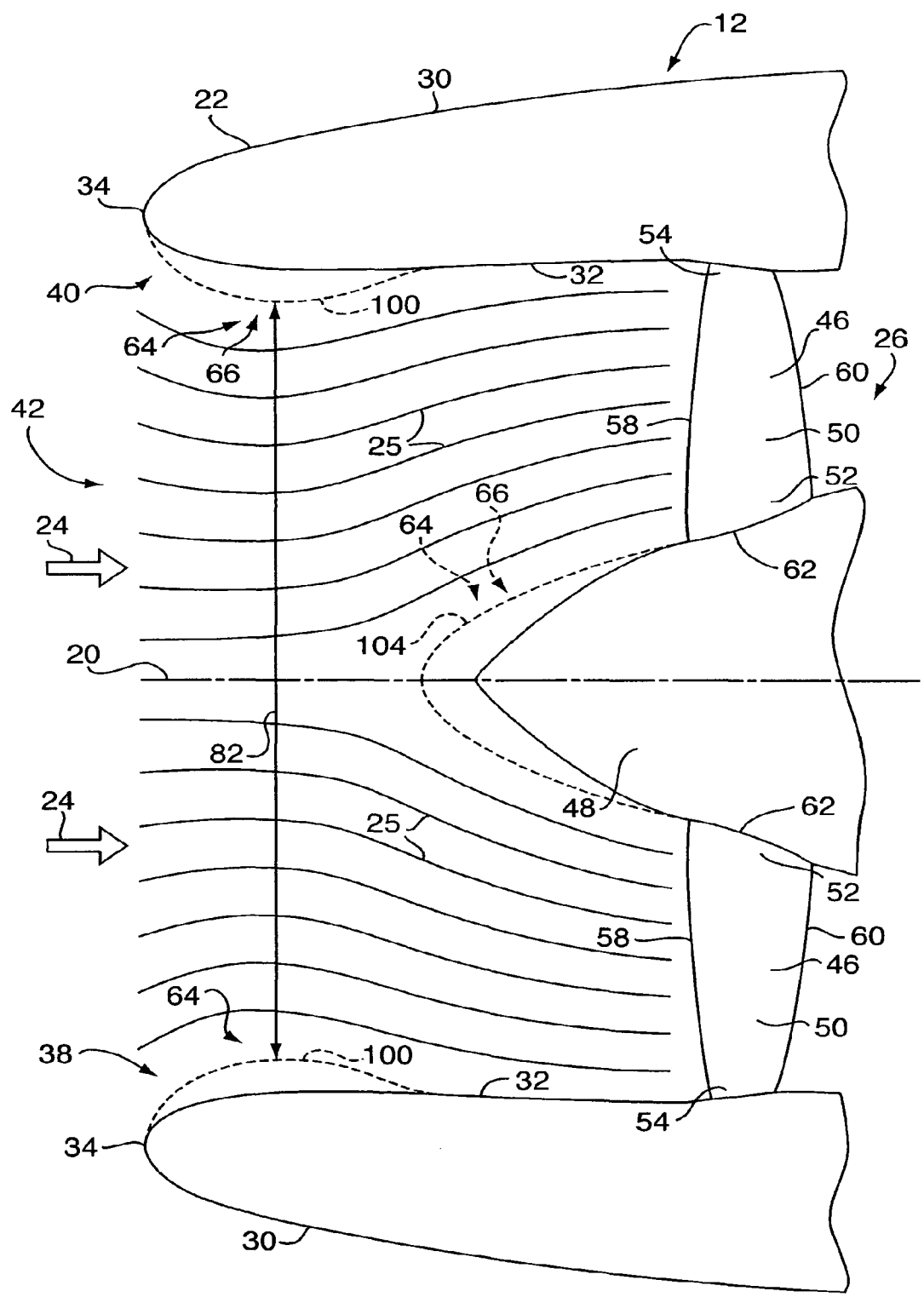
FIG. 7 is a schematic, partially broken-away representation of a portion of a nacelle and fan section including means for reducing inlet area of the gas turbine engine of FIG. 1 according to another embodiment of the present invention.

Referring to FIG. 7, the means for reducing the inlet area 64 may comprise or include a spinner contoured surface 104 formed on the spinner 48, disposed forward of the fan section. The spinner contoured surface 104 extends further forward of the conventional spinner surface and provides a more blunt spinner shape. Either alone or in combination with contoured nacelle surfaces 100,102, the spinner contoured surface 104 reduces the inlet duct area.

Figure 8:
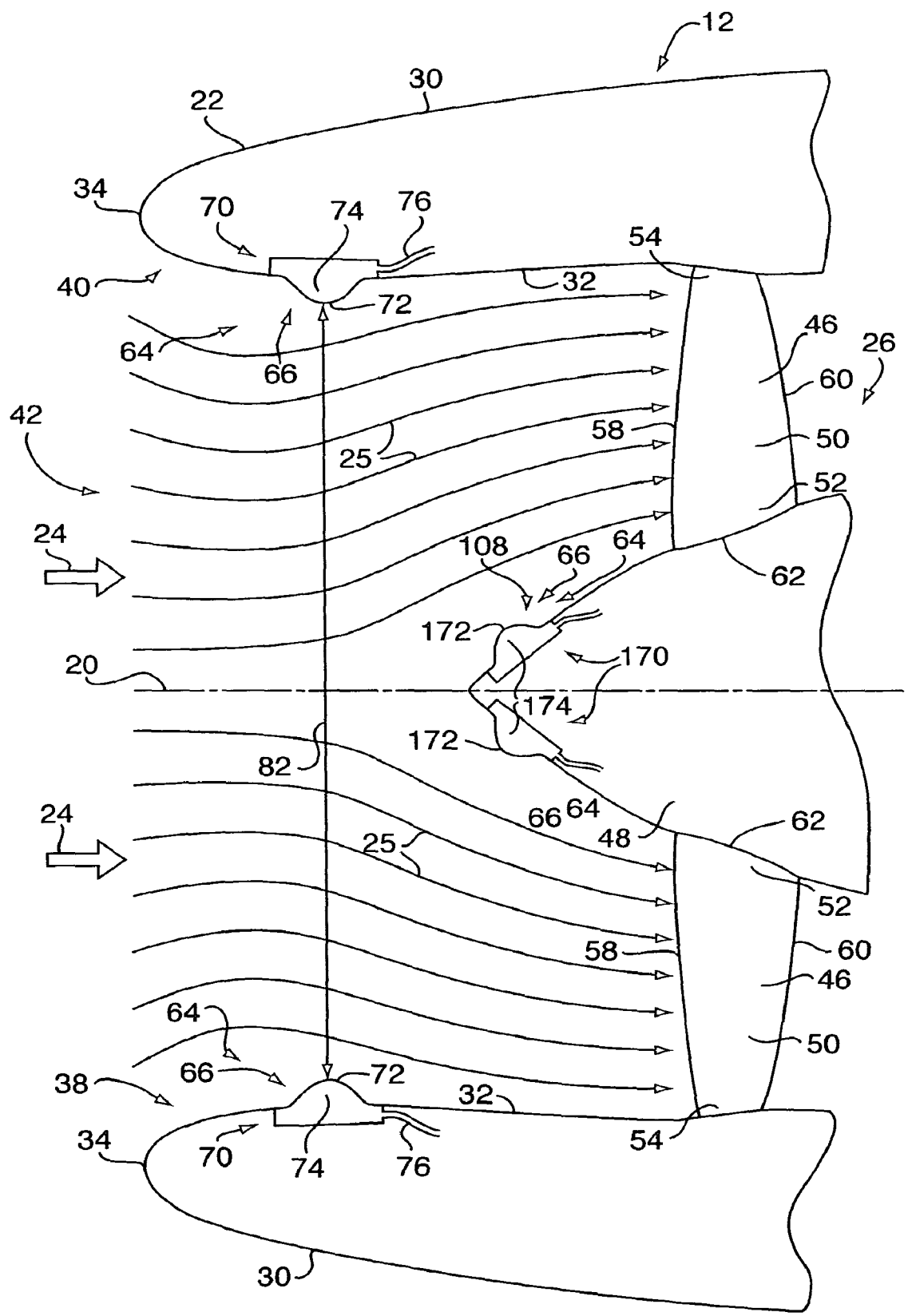
FIG. 8 is a schematic, partially broken-away representation of a portion of a nacelle and fan section including means for reducing inlet area of the gas turbine engine of FIG. 1 according to a further embodiment of the present invention.
Figure 9:
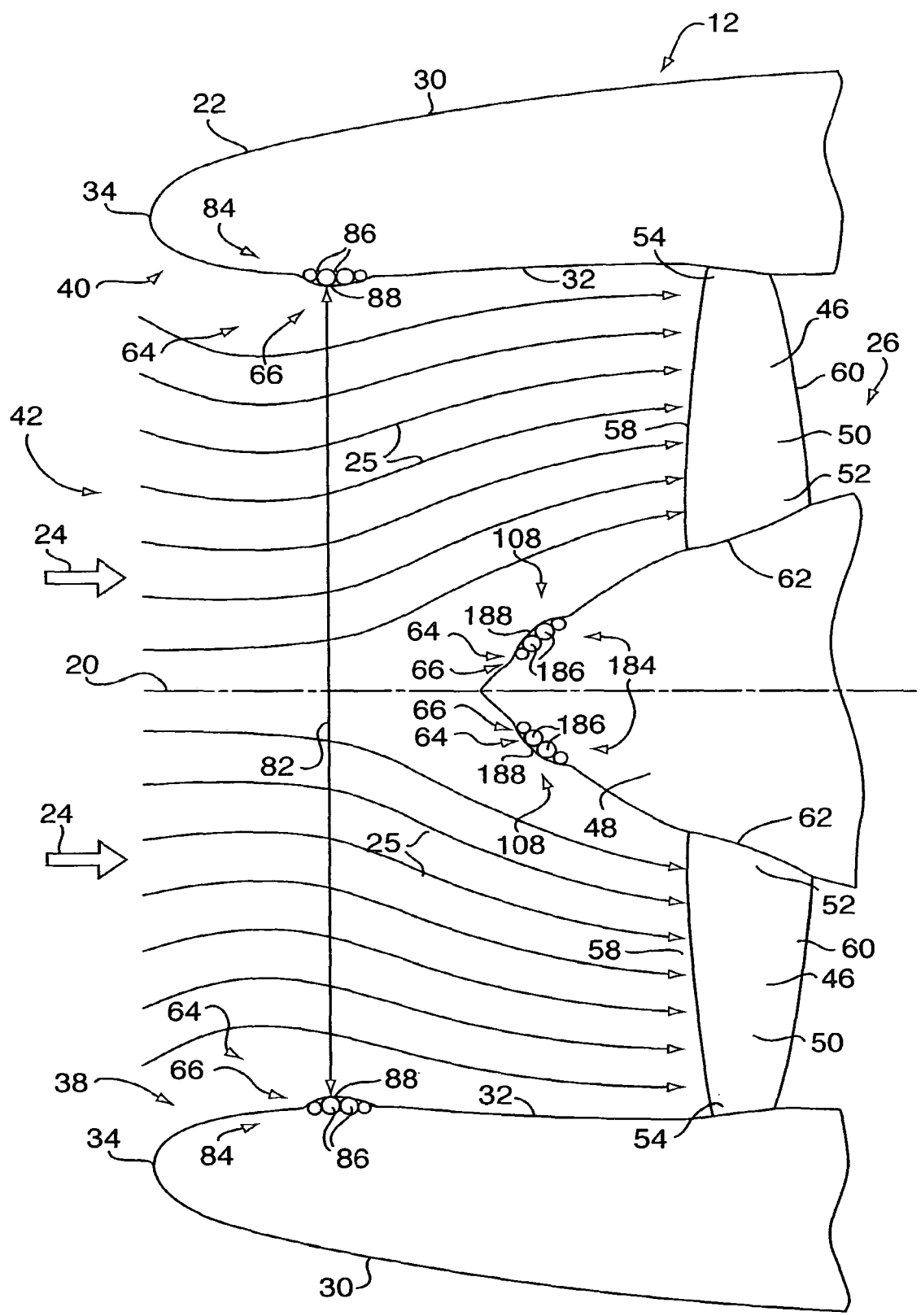
FIG. 9 is a schematic, partially broken-away representation of a portion of a nacelle and fan section including means for reducing inlet area of the gas turbine engine of FIG. 1 according to another embodiment of the present invention.
Figure 10:
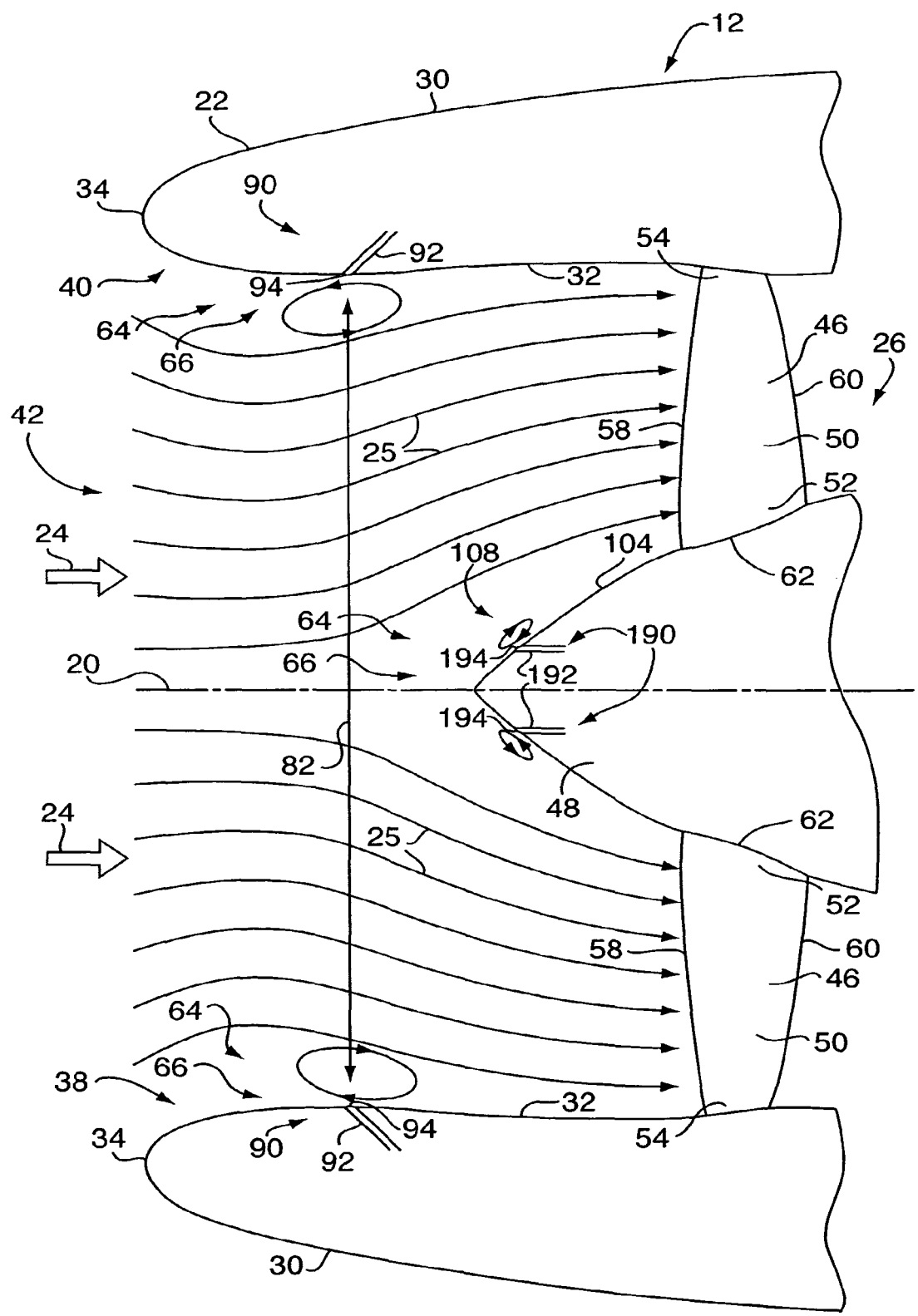
FIG. 10 is a schematic, partially broken-away representation of a portion of a nacelle and fan section including means for reducing inlet area of the gas turbine engine of FIG. 1 according to a further embodiment of the present invention.
Figure 10A:
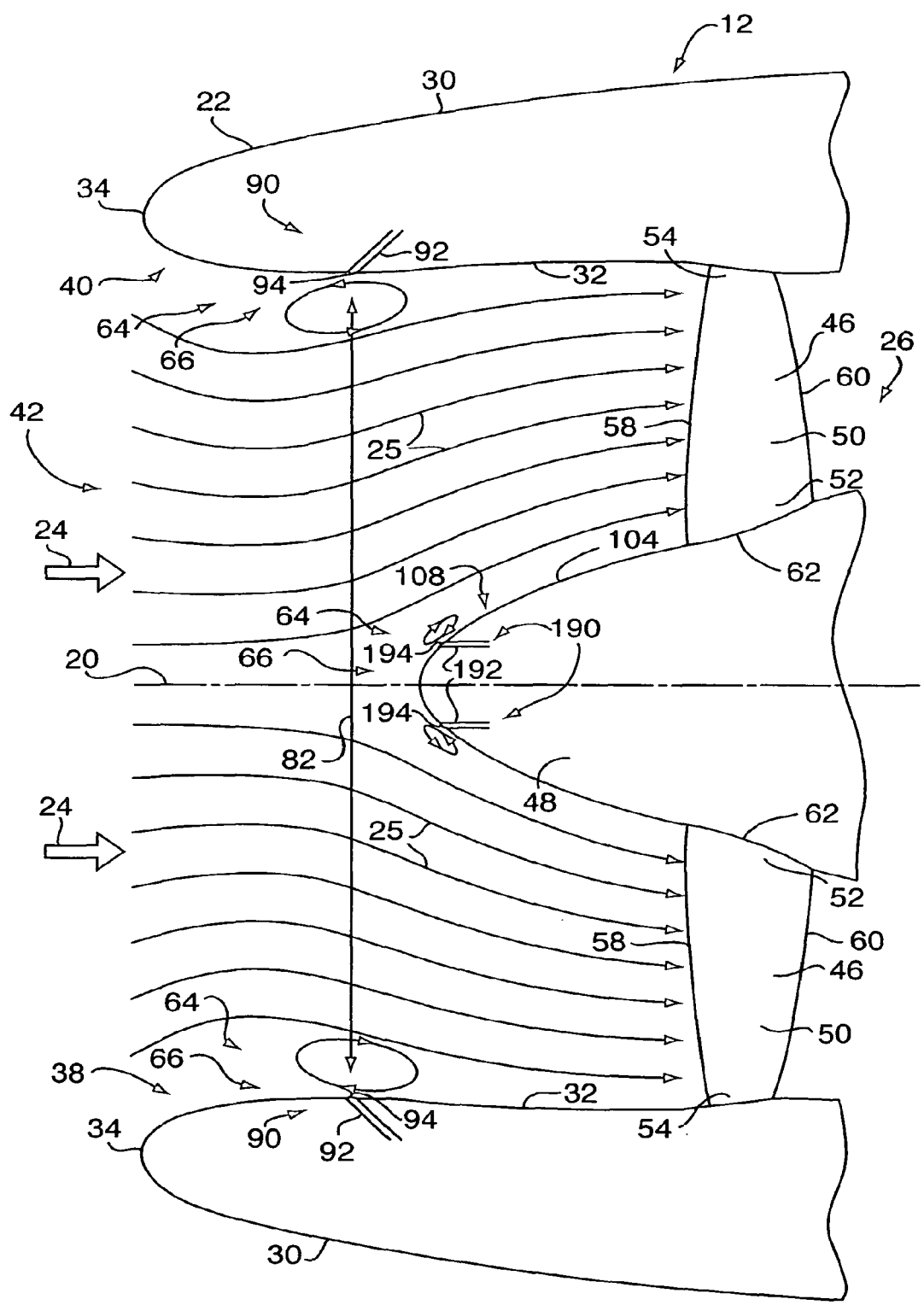
FIG. 10A is a schematic, partially broken-away representation of a portion of a nacelle and fan section including means for reducing inlet area of the gas turbine engine of FIG. 1 according to a further embodiment of the present invention.

Referring to FIGS. 8-10, in these embodiments of the present invention, the means for selectively reducing the inlet area 66 of the nacelle includes the means for selectively varying spinner contour 108. Thus, as shown in FIG. 8, the spinner 48 includes an inflatable bladder 170 to selectively decrease the inlet duct area. As shown in FIG. 9, the spinner 48 includes an SMA actuator 184 having a flexible surface 188 with an SMA member 186 to selectively activate the SMA material. As shown in FIG. 10, the spinner 48 includes a fluidic actuator 190 to output pressurized air into the flow path of air 24. The inflatable bladder 170, the SMA actuator 184 and the fluidic actuator 190, disposed within the spinner, are substantially analogous to those described above and shown in FIGS. 2-4. The bladder 170, the SMA actuator 184 and the fluidic actuator 190 disposed on the spinner can be either used in conjunction with those disposed in the nacelle or alone. Additionally, the bladder 170, the SMA actuator 184 and the fluidic actuator 190 can be disposed in a conventional spinner, as shown in FIGS. 8-10, or be used in conjunction with a blunt spinner as shown in FIG. 10A.

Figure 11:
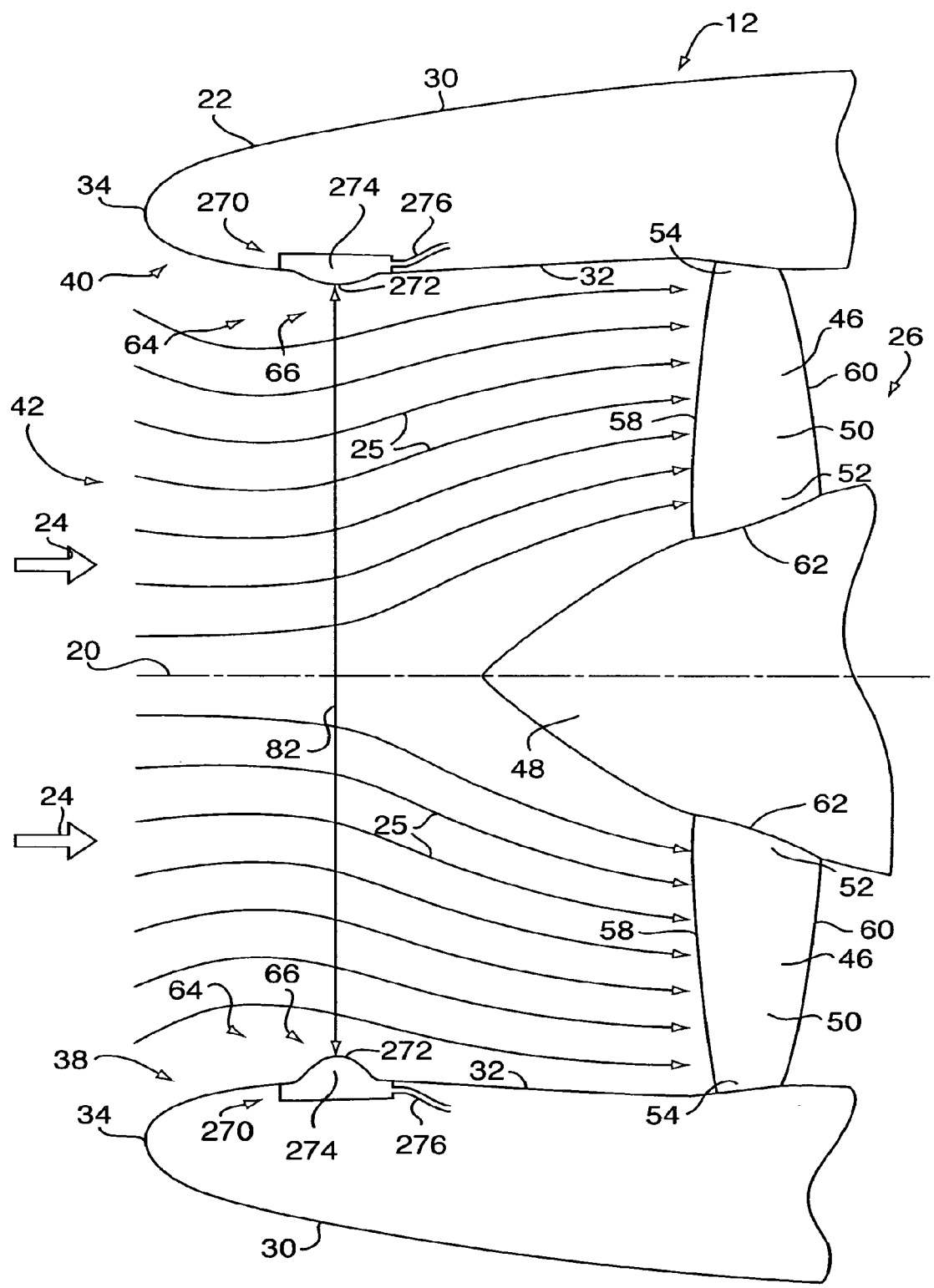
FIG. 11 is a schematic, partially broken-away representation of a portion of a nacelle and fan section including means for reducing inlet area of the gas turbine engine of FIG. 1 according to another embodiment of the present invention.
Figure 12:
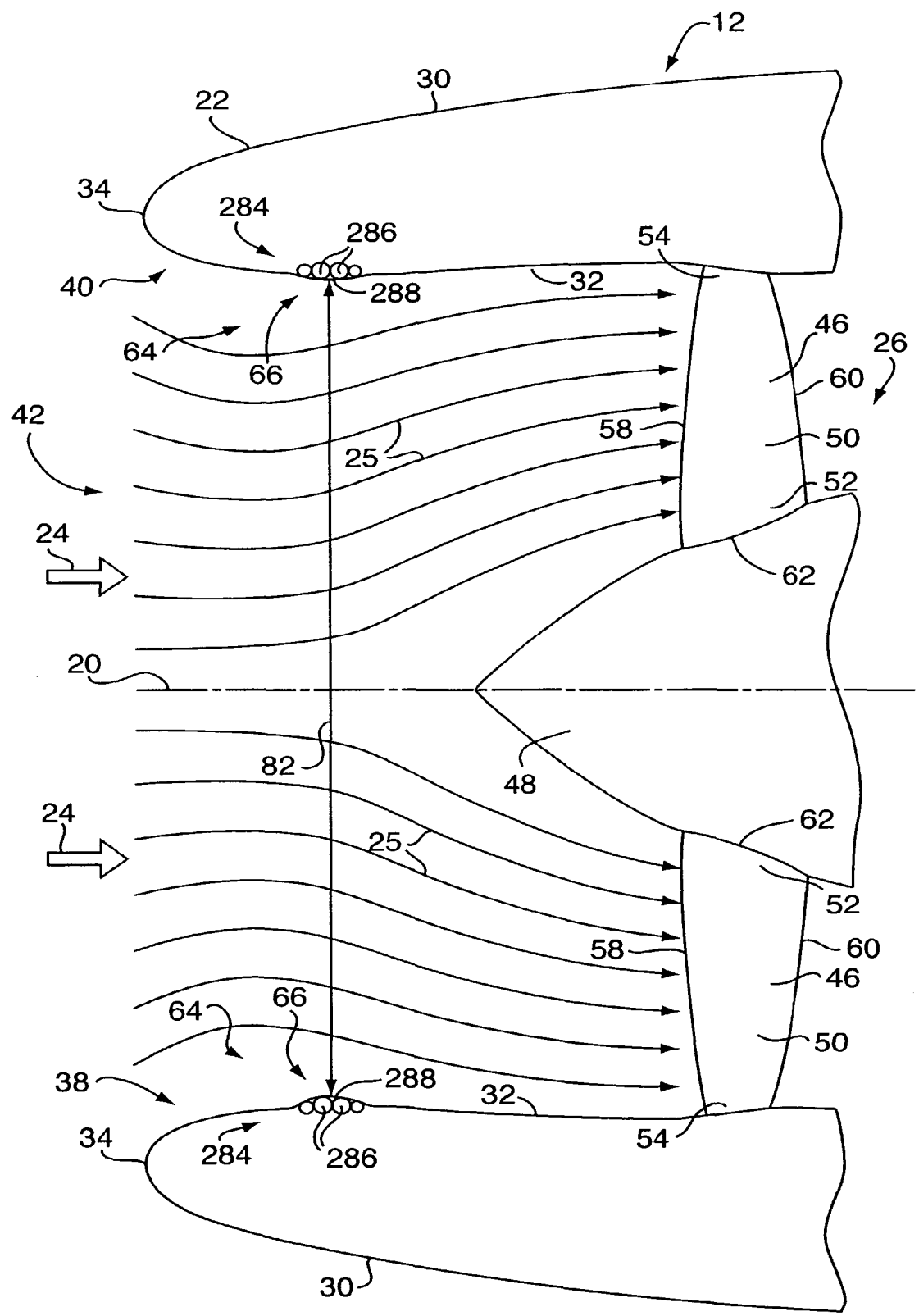
FIG. 12 is a schematic, partially broken-away representation of a portion of a nacelle and fan section including means for reducing inlet area of the gas turbine engine of FIG. 1 according to a further embodiment of the present invention.
Figure 13:
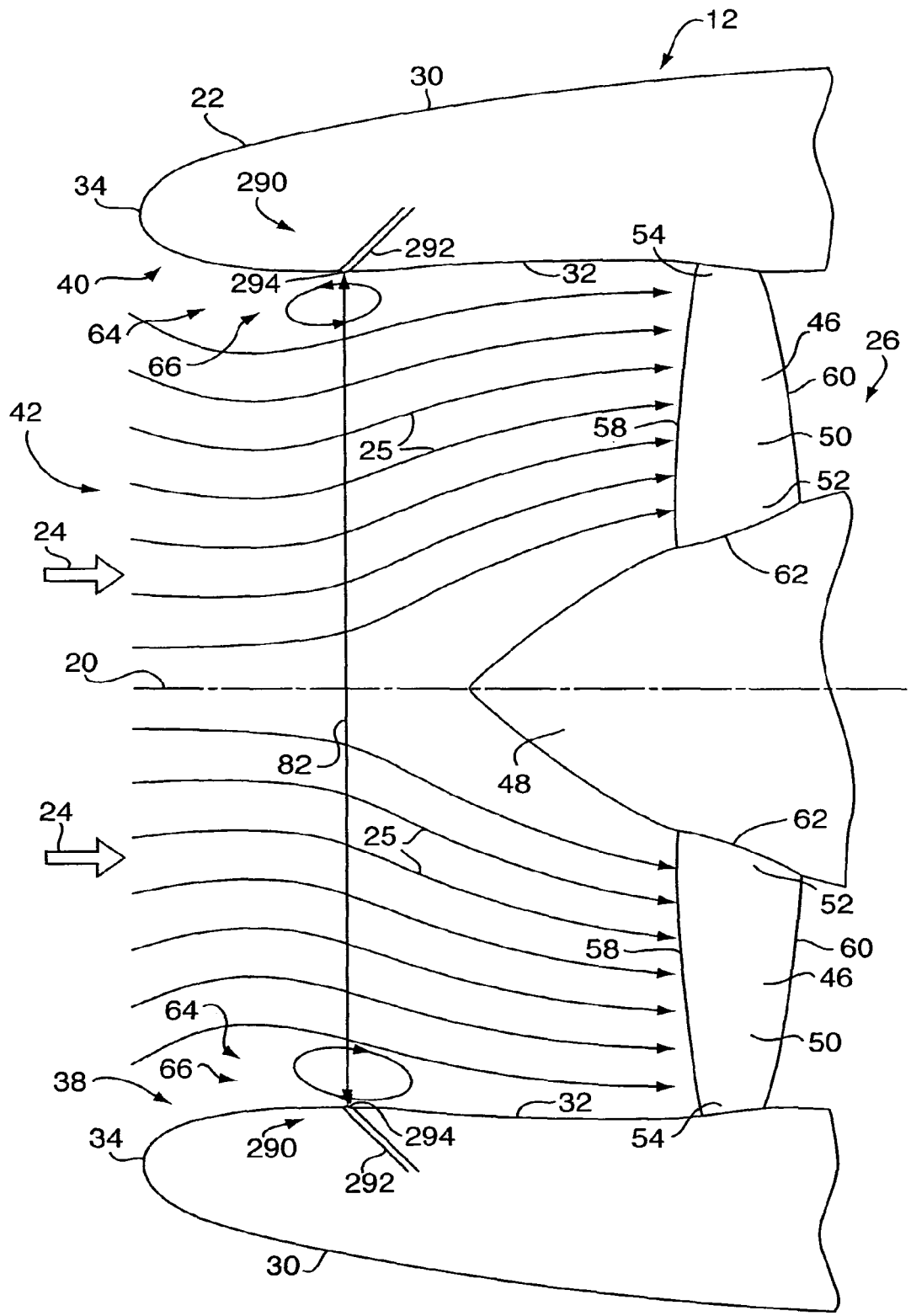
FIG. 13 is a schematic, partially broken-away representation of a portion of a nacelle and fan section including means for reducing inlet area of the gas turbine engine of FIG. 1 according to another embodiment of the present invention.
Figure 14:
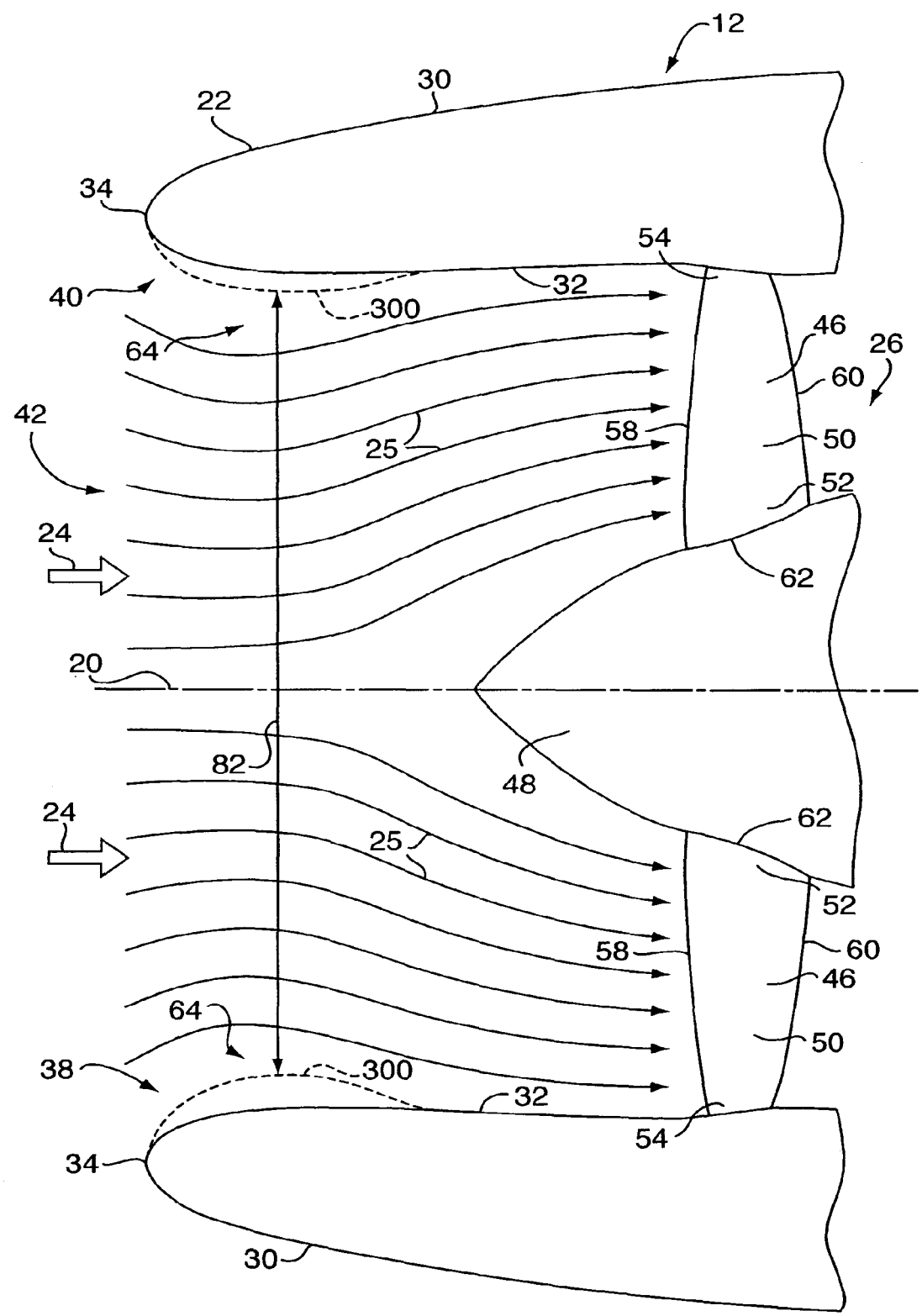
FIG. 14 is a schematic, partially broken-away representation of a portion of a nacelle and fan section including means for reducing inlet area of the gas turbine engine of FIG. 1 according to another embodiment of the present invention.
Figure 15:
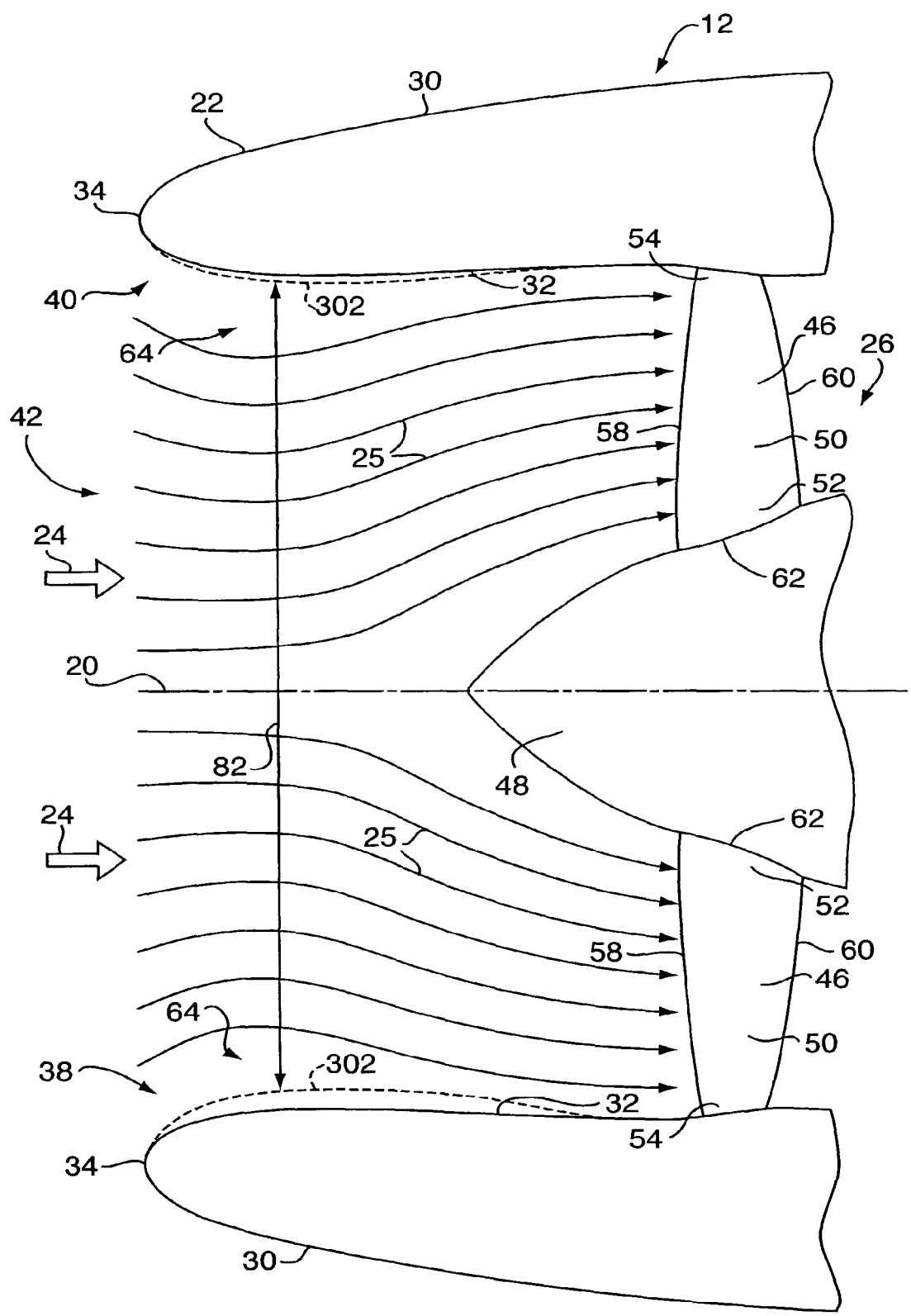
FIG. 15 is a schematic, partially broken-away representation of a portion of a nacelle and fan section including means for reducing inlet area of the gas turbine engine of FIG. 1 according to another embodiment of the present invention.

Referring to FIGS. 11-15, in further embodiments of the present invention, the means for reducing the inlet area 64 is asymmetrical with respect to the nacelle with the upper portion 40 of the nacelle 22 having smaller protrusion relative to the lower portion 38 of the nacelle. As shown in FIG. 11, an inflatable bladder 270 is segmented around the circumference of the nacelle with the bladder in the lower portions 38 of the nacelle either having a greater amount of air pressure supplied or having a larger bladder. With respect to FIG. 12, an SMA actuator 284 either has a greater degree of actuation in the lower portion 38 of the nacelle 22 or is a segmented SMA actuator. With respect to FIG. 13, the lower portion 38 of the nacelle 22 includes either greater amount of air or air at higher pressure channeled than the upper portion 40 of the nacelle. With respect to FIGS. 14 and 15, the contoured surfaces 300, 302 protrude more radially inward in the lower portion 38 of the nacelle 22.

Figure 16:
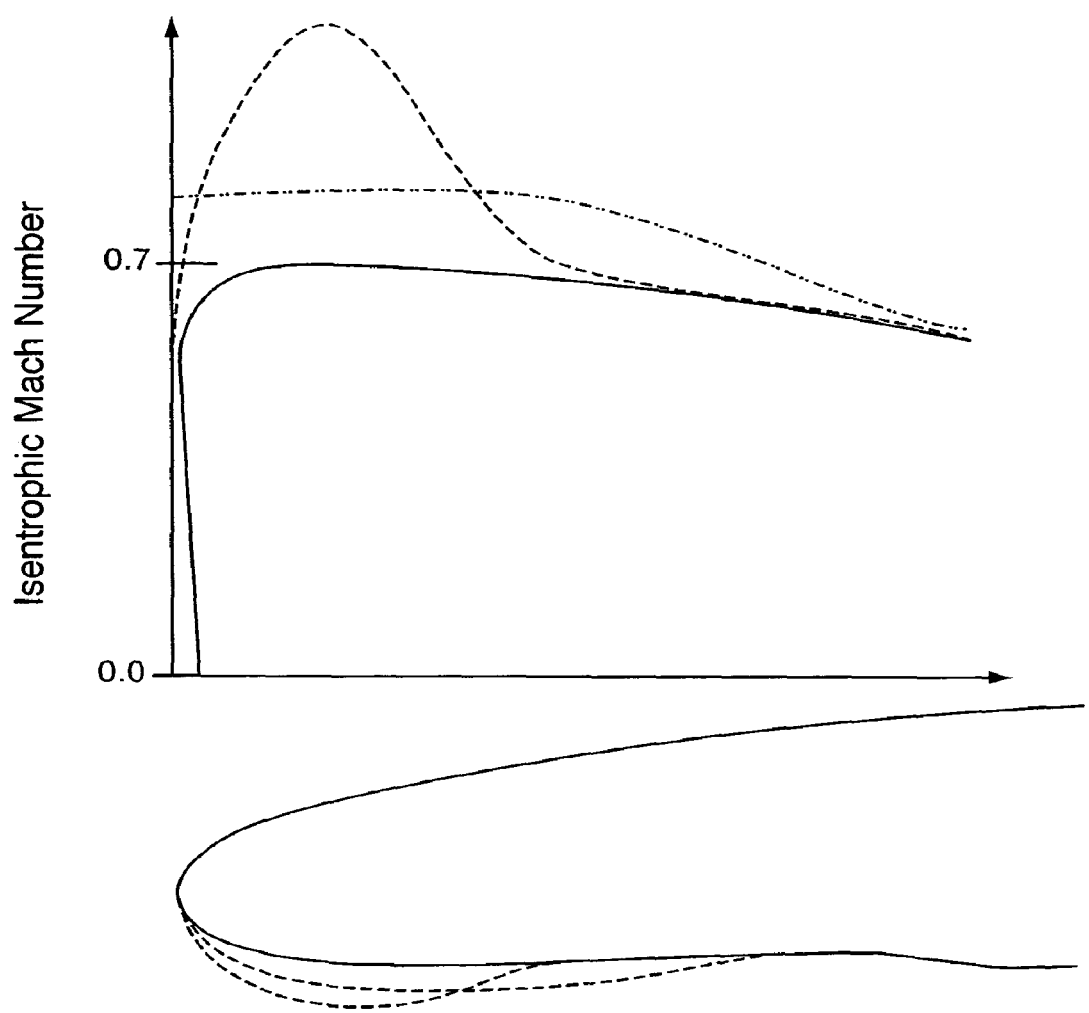
FIG. 16 is a schematic representation of a forward portion of a nacelle of the gas turbine engine of FIG. 1 and a corresponding graph of isentropic Mach number corresponding to the internal portion of the nacelle.

In operation, for embodiments described above and shown in FIGS. 2-3, 8-13, the means for selectively reducing the inlet area 66 is activated during the acoustic sideline (takeoff) and/or flyover (cutback) conditions of the engine. Thus, as the means for selectively reducing the inlet area 66 are activated during takeoff and cutback conditions, the bladder 70,170, 270 and the SMA actuator 84, 184, 284, shown in FIGS. 2 and 3, respectively, are activated into distended position to reduce the inlet duct area, thereby forming the throat 82. The throat, with significantly reduced inlet duct area, increases shock decay. Contraction of the flow path of air 24 increases curvature of the streamlines 25 and results in acceleration of the mean flow 24, thereby increasing the Mach number of the incoming airflow 24, as shown in FIG. 16. The elevated Mach number of the incoming air 24 during the takeoff and cutback conditions counteracts the acoustic power radiating from the inlet, thereby enhancing noise attenuation. The noise generated by the fan 26 is most significant at the takeoff and cutback conditions as the rotor speed at the tip 54 of the fan blades 50 is supersonic, thereby generating a shock wave field at the leading edge 58 of each blade toward the tip 54 of the blade. The shock waves suffer a natural decay process as they propagate upstream of the fan, and the resulting unsteady pressure emerging from the inlet propagates outside of the engine as tone noise. The rate of decay of the shock pattern through the inlet duct depends on the Mach number of the flow approaching the rotor. The greater the Mach number of the incoming flow 24, the greater is the rate of attenuation of the noise generated by the fan section 12. The introduction of local increases in the Mach number enhances shock wave dissipation during the most critical conditions, such as takeoff and cutback. However, during other conditions, for example, such a cruise, it may be undesirable to have reduction in the intake duct area. Therefore, for other conditions, such as a cruise condition, the bladder, SMA actuator and fluid actuator are deactivated and the nacelle inlet area is restored to its original size Referring to FIG. 4, the fluidic actuator 90 is activated during certain engine conditions to generate flow of air to interfere with incoming air 24. Such interference causes effective reduction of inlet duct area for incoming flow and effectively forms throat 82.

Referring to FIG. 5, the nacelle contoured surface 100 provides for rapid acceleration and increase in Mach number of the incoming flow 24 to reduce the emanating noise. However, other engine design considerations may make rapid acceleration and increase in Mach number undesirable. For example, the elevated Mach number renders the inlet susceptible to separation when crosswind is present. Therefore, depending on a particular engine and specific other considerations, it may be desirable to either have rapid acceleration as shown in FIG. 5 or have a more moderately high Mach number value held over a greater portion of the duct length shown in FIG. 6 and illustrated in FIG. 16.

Referring to FIG. 6A, the contoured surface 103 formed on the inner nacelle surface 32 reduces the inlet duct area during all operating conditions of the engine. The means for reducing the inlet area 66 further reduces the inlet duct area when the means for reducing the inlet area 66 is in the deployed or activated condition. This configuration is beneficial since the contoured surface 103 may have a slight contour to slightly increase Mach number of incoming air 24. The means for selectively reducing the inlet area 66 would enhance noise attenuation during critical conditions of engine operation, such as takeoff and fly over.

Referring to FIG. 7, the spinner contoured surface 104 enhances effectiveness of dissipation of shock waves. The spinner 48 having more blunt shape and extending forward of a conventional spinner has the effect of squeezing the streamlines 25 between the spinner 48 and nacelle throat 82 resulting in increased Mach number of the incoming airflow 24. Additionally, the fan blade hub 62 may also need to be changed to further increase effectiveness of the present invention. As shown in FIGS. 8-10, the means for selectively varying spinner contour 108 are also activated during the takeoff and cutback conditions and deactivated during other conditions, such as cruise. The means for selectively varying spinner contour 108 may be used alone or in as part of the means for reducing the inlet area 64. Additionally, the means for selectively varying spinner contour 108 can be used alone, as shown in FIGS. 5, 8 and 9, or in combination with spinner contoured surface 104, as shown in FIG. 10.

Referring to FIGS. 11-15, the means for reducing the inlet area 64 as described above, may not be symmetrically. As is known in the art, it is desirable to minimize the acoustic power radiated downward from the aircraft. Therefore, the Mach number of the incoming flow of air 24 is increased to the greater extent at the lower portion 38 of the nacelle 22 to achieve greater attenuation at the lower portion 38 of the nacelle relative to the upper portion 40 of the nacelle. Thus, the means for reducing the inlet area 64 extend radially inward and interfere with the incoming air 24 to a greater extent at the lower portion 38 of the nacelle than the upper portion 40 thereof. This design allows attenuation of noise in the area that presents greater problem while minimizing interference with incoming airflow 24 at locations that present lesser problem.

One major advantage of the present invention is that it addresses reduction of noise emanating from a gas turbine engine. Thus, either permanent or selective reduction of noise in a gas turbine engine renders the engine in compliance with new and more stringent regulations promulgated by various authorities. Although embodiments showing permanent changes to the contour of the inner nacelle surface and/or the spinner, such as shown in FIGS. 5-7 and 14-15 are useful in certain engine applications, the embodiment with selective variation of the inner nacelle surface contour are more widely applicable and can be used on a wider variety of engines. The means for selectively reducing inlet area 66 allows maximization of noise reduction during critical conditions, such as takeoff and cutback, without interfering with operating conditions of the engine during other conditions, such as cruise.

While the present invention has been illustrated and described with respect to a particular embodiment thereof, it should be appreciated by those of ordinary skill in the art that various modifications to this invention may be made without departing from the spirit and scope of the present invention. For example, any combination of means for reducing the inlet area 64 can be used. More specifically, the means for selectively reducing the inlet area 66 such as the inflatable bladder, the SMA actuator and the fluidic actuator, can be used either alone on the inner nacelle surface and/or on the spinner surface, or in combination with either or both, the nacelle contoured surface and/or the spinner contoured surface.

We claim:

1. A gas turbine engine comprising:
a nacelle enclosing a fan section, a compressor, a combustor and a turbine, said nacelle including an inner nacelle surface defining an inlet duct having a flow area; and
an actuator disposed in said inner nacelle surface for selectively reducing said flow area to increase the Mach number of air into said gas turbine engine to enhance acoustic attenuation associated with said inlet duct, wherein said actuator comprises an inflatable bladder disposed in said nacelle and having an inflated state wherein said inflatable bladder protrudes into said flow area of said inlet duct, and, in said inflated state, a portion of said inflatable bladder disposed in an upper portion of said inlet duct has a smaller protrusion into said flow area relative to a portion of said inflatable bladder disposed at a lower portion of said inlet duct.

2. The gas turbine engine of claim 1 wherein said inner nacelle surface is downstream of a leading edge.

3. A gas turbine engine comprising:
a nacelle enclosing a fan section, a compressor, a combustor and a turbine, said nacelle including an inner nacelle surface defining an inlet duct having a flow area; and
an actuator disposed in said inner nacelle surface for selectively reducing said flow area to increase the Mach number of air into said gas turbine engine to enhance acoustic attenuation associated with said inlet duct, wherein said actuator comprises an inflatable bladder disposed in said nacelle which, when inflated reduce said flow area of said inlet duct, and wherein said inflatable bladder is segmented around said circumference of said nacelle to allow asymmetrical deployment thereof.

4. A gas turbine engine comprising:
a nacelle enclosing a fan section, a compressor, a combustor and a turbine, said nacelle including an inner nacelle surface;
a spinner disposed on said fan section such that said inner nacelle surface and said spinner defines an inlet duct; and
a shape memory alloy actuator disposed in said spinner said shape memory alloy actuator including a compliant surface moveable between a distended position into said inlet duct and a retracted position withdrawn from said inlet duct.

5. The gas turbine engine of claim 4 further comprising a multiple of fan blades which extend from said spinner.

6. The gas turbine engine of claim 4, wherein said shape memory alloy actuator includes a plurality of shape memory alloy members located radially outwards of said compliant surface.

7. The gas turbine engine of claim 6, wherein said plurality of shape memory alloy members comprise rings.

8. The gas turbine engine of claim 6, wherein said plurality of shape memory alloy members comprise ropes.

9. The gas turbine engine of claim 6, wherein in said distended position said shape memory alloy actuator asymmetrically protrudes into said inlet duct.

10. A gas turbine engine comprising:
a nacelle enclosing a fan section, a compressor, a combustor and a turbine, said nacelle including an inner nacelle surface defining an inlet duct having a flow area; and
a shape memory alloy actuator including shape memory alloy members located adjacent a compliant surface bounding said flow area, said compliant surface including a distended position extending into said flow area and a retracted position withdrawn from said flow area.

* * * * *